US012223796B2

(12) United States Patent
Vrabec et al.

(10) Patent No.: US 12,223,796 B2
(45) Date of Patent: *Feb. 11, 2025

(54) ELECTRONIC GAMING MACHINE FOR PLAYING A WAGERING DICE GAME

(71) Applicant: ZUUM LIMITED, Limassol (CY)

(72) Inventors: Blaž Vrabec, Dob (SI); Mitja Kolman, Limassol (CY)

(73) Assignee: ZUUM LIMITED, Limassol (CY)

( * ) Notice: Subject to any disclaimer, the term of this patent is extended or adjusted under 35 U.S.C. 154(b) by 509 days.

This patent is subject to a terminal disclaimer.

(21) Appl. No.: 17/462,344

(22) Filed: Aug. 31, 2021

(65) Prior Publication Data

US 2022/0277609 A1 Sep. 1, 2022

Related U.S. Application Data

(63) Continuation of application No. 17/186,635, filed on Feb. 26, 2021, now Pat. No. 11,138,824.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3211* (2013.01); *G07F 17/3216* (2013.01); *G07F 17/3288* (2013.01)

(58) Field of Classification Search

CPC ... G07F 17/32; G07F 17/3214; G07F 17/3222

USPC ........................ 463/1, 16, 18, 20, 22, 25, 39

See application file for complete search history.

(56) References Cited

U.S. PATENT DOCUMENTS

| | | |
|---|---|---|
| 6,146,270 A | 11/2000 | Huard et al. |
| 7,874,905 B2 | 1/2011 | Yoshizawa |
| 8,216,057 B2 | 7/2012 | Yoshihara |

(Continued)

FOREIGN PATENT DOCUMENTS

| | | |
|---|---|---|
| JP | 2008104569 A | 5/2008 |

OTHER PUBLICATIONS

Slot Red, Play Free Sic Bo Dragons Dice Game by Wazdan+Read Review Guide, https://www.slotred.com/free-wazdan/sic-bo-dragons/ accessed Dec. 7, 2020.

*Primary Examiner* — Adetokunbo O Torimiro

(74) *Attorney, Agent, or Firm* — Nicholas Pfeifer; Smith & Hopen, P.A.

(57) ABSTRACT

An electronic gaming machine for playing a wagering dice game. A player terminal of the electronic gaming machine has a display device having three display areas. The first display area displays a plurality of user-selectable wagering options associated with the wagering dice game. The second display area displays a first plurality of colored die images, each die image displaying a predicted die outcome. The third display area displays a second plurality of colored die images, each die image displaying an actual die outcome. If the predicted die outcomes displayed on the first plurality of colored die images at least partially match the actual die outcomes displayed on the second plurality of respectively colored die images, a user wins a reward in a bonus game. The reward enables the user to repeat eligible user-placed wagers in a bonus round of the wagering game, without requiring user funding for the repeated wagers.

19 Claims, 10 Drawing Sheets

(56) References Cited

U.S. PATENT DOCUMENTS

| | | | |
|---|---|---|---|
| 8,235,804 | B2 | 8/2012 | Gagner et al. |
| 8,360,844 | B2 | 1/2013 | Schwartz et al. |
| 8,986,104 | B2 | 3/2015 | Nicely |
| 2008/0214294 | A1 | 9/2008 | Yoshizawa |
| 2012/0322529 | A1 | 12/2012 | Gilbertson |
| 2014/0162758 | A1 | 6/2014 | Pececnik et al. |

ELECTRONIC GAMING MACHINE FOR PLAYING A WAGERING DICE GAME

PRIORITY CLAIM

This U.S. non-provisional application is a continuation of and claims priority to U.S. non-provisional application Ser. No. 17/186,635 filed on Feb. 26, 2021.

BACKGROUND OF THE INVENTION

1. Field of the Invention

This invention relates to electronic gaming machines. More specifically, it relates to an electronic gaming machine for playing a novel and non-obvious wagering dice game.

2. Brief Description of the Related Art

Casinos, resorts, and gaming establishments often provide entertainment to their patrons in a form of wagering games. Traditionally, popular wagering games—such as roulette, blackjack, craps, poker, and Sic Bo—have been provided at designated betting tables. These games typically involve a human dealer that administers the game and a plurality of players sitting or standing at the betting table. Recently, however, many establishments are moving away from live betting tables due to the associated risk of facilitating the spread of communicable diseases and a shifting consumer demand for automated electronic gaming machines that offer an increased level of privacy and enable players to play at their own pace.

Such electronic gaming machines provide an opportunity to enhance the entertainment experience for the players, while also increasing revenue for the gaming establishment. Many players are familiar with traditional wagering games and, therefore, are drawn to gaming machines that enable them to play these games. However, as the rounds of a wagering game are repeated over-and-over, the entertainment value of the game diminishes. Accordingly, there is a significant demand for electronic gaming machines that offer additional betting opportunities and interesting variations of the well-known wagering games. Therefore, the gaming establishments have a strong but unresolved demand for gaming machines that keep their customers engaged and entertained.

SUMMARY OF THE INVENTION

The problem stated above is now resolved by a gaming machine implementing a novel and non-obvious wagering dice game. An electronic gaming machine comprises a display device, one or more computer processors, and a tangible, non-transitory computer-readable storage medium. The computer-readable storage medium has a plurality of instructions stored thereon, which, when executed by the processer, cause the processor to perform a set of steps enabling a user to play the novel and non-obvious wagering game.

The gaming machine may further comprise a credit input mechanism configured to interact with a physical item associated with monetary value to establish a credit balance for the user to fund user-selected wagers and/or a cash-out mechanism configured to enable a withdrawal from the credit balance. The gaming machine may further include a mechanical die outcome generator configured to roll three physical dice. The mechanical die outcome generator is communicatively coupled with the computer processor, such that the computer processor is configured to obtain the dice roll outcomes from the mechanical die outcome generator. Alternatively, the gaming machine may use a software-based random generator to generate and obtain die outcomes for resolving the wagering game.

In an embodiment, the display device of the gaming machine displays a graphic user interface (GUI) having at least three display areas. The first display area is configured to display a plurality of user-selectable wagering options in a wagering game, wherein the gaming machine is configured to receive a user input corresponding to the user-selected wagering options.

The second display area of the display device is used to display a first plurality of die images representing a plurality of predicted die outcomes, which can be machine-selected rather than user-selected. The first plurality of die images includes a first die image having a first visual characteristic and displaying a first predicted die outcome, a second die image having a second visual characteristic and displaying a second predicted die outcome, a third die image having a third visual characteristic and displaying a third predicted die outcome, and a fourth die image displaying a fourth predicted die outcome. The first, second, and third visual characteristics are visually distinguishable from one another. In an embodiment, the distinguishing visual characteristics of the die images are represented by different colors.

After the computer processor obtains actual die outcomes from the mechanical die outcome generator, the software-based die outcome generator, or a combination thereof, the third display area is used to display a second plurality of die images representing the actual die outcomes. The second plurality of die images consist of three dice, each having a distinguishing visual characteristic corresponding to the visual characteristic of one of the die images displaying the predicted die outcomes.

If the first, the second, and the third predicted die outcomes match one or more of the first, the second, and the third actual die outcomes, the gaming machine displays a notification on the display device notifying a user that the user won a first reward. In an embodiment, if the first, the second, and the third predicted die outcomes match the first, the second, and the third actual die outcomes, respectively, the gaming machine displays a notification on the display device notifying the user that the user won a first reward. Alternatively, if the first and the second predicted die outcomes match the first and the second actual die outcomes, respectively, and the fourth predicted die outcome matches the third actual die outcome, the gaming machine displays a notification on the display device notifying the user that the user won a second reward.

In an embodiment, if the user wins the first reward or the second reward, qualifying user-selected wagers are repeated for a bonus round of the wagering game, without requiring the user to fund the repeated wagers. However, certain non-qualifying wagers may be excluded from the bonus round of the wagering game. Furthermore, in some embodiments, to repeat the user-placed wagers in the bonus round, a user may be required to place one or more new user-funded wagers in the bonus round.

In an embodiment, the gaming machine may be configured to present the user with an option to resolve the bonus round of the wagering game based on an outcome of the software-based die outcome generator, rather than physical dice used in the mechanical die outcome generator.

In the bonus round, a monetary amount associated with the at least one of the user-selected wagers can be automatically multiplied by a coefficient associated with the user's reward. The coefficient associated with winning the second reward may be lower than the coefficient associated with winning the first reward. The coefficient may be configured to be greater than 1, less than 1, or equal to 1.

In an embodiment, to gain eligibility to win the first or the second reward, the user-selected wagers may be required to satisfy a predetermined condition. For example, the wagering options in the wagering game may be partitioned into two categories: qualifying wagering options included in the bonus game and non-qualifying wagering options excluded from the bonus game. The predetermined condition may require the user to select a certain number of qualifying wagering options to gain eligibility to win the first or the second reward. The predetermined condition may further require the user to bet a certain amount of money or credits on the qualifying wagers. Alternatively, a user may be required to elect a reduced payout for the user-selected wagers in the wagering game as a prerequisite for eligibility to win the first or the second reward. The gaming machine may be configured to display an eligibility indicator, conveying to the user whether the user-selected wagers satisfy the predetermined condition for becoming eligible to with the first or the second reward.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and changes may be made without departing from the scope of the invention.

Figure 1:
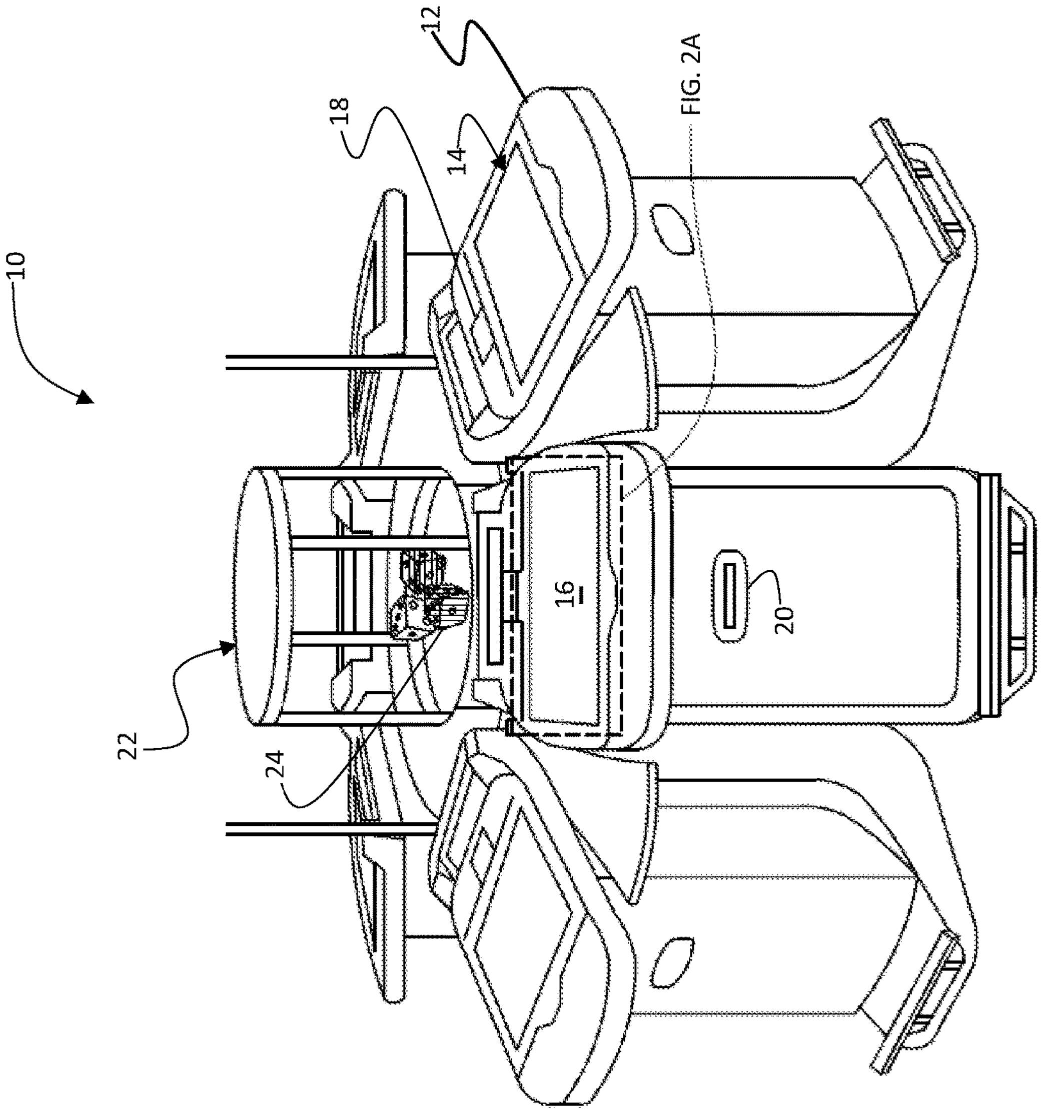
FIG. 1 is a perspective view of the gaming machine according to an embodiment of the invention.

FIG. 1 depicts an electronic gaming machine 10 according to an embodiment of the present invention. Gaming machine 10 may comprise one or more player terminals 12. Each player terminal 12 has a display device 14 configured to display a graphic user interface (GUI) 16 (depicted in more detail in FIG. 2). Gaming machine 10 has one or more computer processors configured to execute a set of instructions stored on a non-transitory computer readable medium that, when executed by a computer processor, enable a user to play a wagering game.

In an embodiment, display device 14 may be a touch-screen. In this embodiment, a user can place bets and interact with controls displayed on GUI 16 by simply touching the corresponding regions of display device 14. Alternatively, gaming machine 10 may use one or more buttons, a joystick, a trackpad, a pointing device, a keyboard, a microphone, a camera, or any other means known in the art for receiving user input to enable the user to place bets and interact with controls displayed on GUI 16.

FIG. 1 further depicts that gaming machine 10 may comprise a credit input mechanism 18. Credit input mechanism 18 may be configured to fund a user account by accepting a credit card payment, a banknote, or a proprietary token, card, or chip having monetary value or game credits associated therewith, etc. In some embodiments, credit input mechanism 18 may be configured to receive funds (whether monetary or gaming credits) via wireless means, such as near field communication (NFC), radio frequency identification (RFID), or the like. Furthermore, credit input mechanism 18 may be configured to read a user's biometric information (for example, by scanning fingerprints or retina) or to require the user to input his or her credentials associated with a funding source, for example a financial account. In some embodiments, credit input mechanism 18 may involve a physical device associated with gaming machine 10. In other embodiments, credit input mechanism 18 may be an application displayed on display device 14 and configured to facilitate funding of a user's account upon authenticating that user. A person of ordinary skill in the art will recognize that other types of credit input mechanisms, currently known or invented in the future, also fall within the scope of the invention.

FIG. 1 further depicts that gaming machine 10 may comprise a cash-out mechanism 20. Analogously to credit input mechanism 18, cash-out mechanism 20 may be implemented in various ways. For example, cash-out mechanism 20 may be configured to provide a card or a token having monetary value associated therewith. In other embodiments, cash-out mechanism 20 may be configured to automatically credit a user's financial account used to fund the wagering game or deposit the funds to another account. Again, a person of ordinary skill in the art will recognize that various means of cashing-out a user's account, whether currently in existence or invented in the future, fall within the scope of the invention.

FIG. 1 further depicts that gaming machine 10 may have a die outcome generator 22 having a plurality of physical dice 24. In this embodiment, die outcome generator 22 is configured to launch physical dice 24 and then determine the outcome of the dice roll. The outcome of the dice roll can be determined using an optical device to determine the number of pips on the top face of each die. Alternatively, dice 24 may be equipped with RFID chips, enabling die outcome generator 22 to quickly and accurately determine the outcome of each dice roll and communicate that outcome to the processor of gaming machine 10. In alternative embodiments, gaming machine 10 may use a software-based (pseudo) random generator, a different type of a mechanical generator, or a combination thereof.

In the embodiment depicted in FIGS. 2A-2H, the invention pertains to a novel and non-obvious wagering dice game that provides a new dimension to a popular dice game of Sic Bo, also known as Tai Sai, Dai Siu, Cussec, Big and Small, Hi-Lo, and other names. The present invention advances the state of the art of electronic wagering dice games by providing a bonus game—referred to herein as FREE ROLL. This bonus game brings new and exciting aspects of game play that can lead to increased player winnings and entertainment, without interfering with the true traditional game of Sic Bo.

As will be explained in more detail below, to gain eligibility for FREE ROLL, a user may be required to bet a certain amount of money or credits on specific wagers or accept a decreased payout for winnings in the primary wagering game.

Figure 2A:
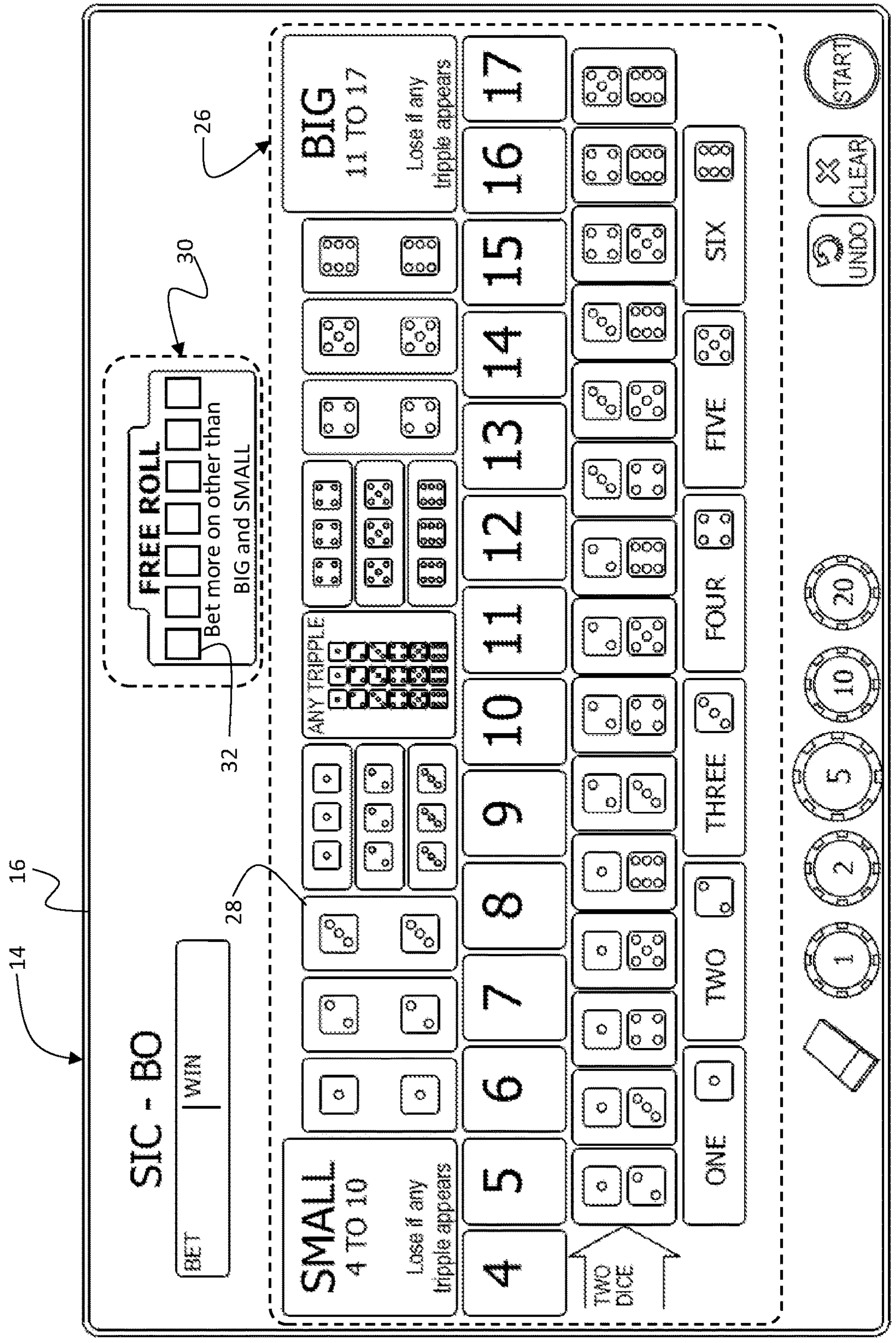
FIG. 2A is a schematic view of the display device displaying a graphic user interface (GUI) of the gaming machine before the user places any wagers.

FIG. 2A depicts display device 14 of player terminal 12 displaying GUI 16. FIG. 2A depicts that display device 14 has a first display area 26 that displays a plurality of wagering options 28 in the wagering dice game. As discussed above, in an embodiment, the wagering options displayed in first display area 26 may correspond to the traditional wagering options available in a traditional wagering game—in this example, Sic Bo. In this manner, GUI 16 achieves the goal of presenting users with a welcoming wagering game interface having a familiar betting layout arranged analogously to a traditional betting table.

As stated above, to gain eligibility for the bonus game of FREE ROLL, a user may be required to satisfy one or more predetermined conditions. To that end, FIG. 2A depicts that GUI 16 has a second display area 30, separate from first display area 16. In an embodiment, second display area 30 may be configured to display an eligibility indicator 32. One of the purposes of eligibility indicator 32 is to visually convey to a user whether his or her placed wagers are sufficient to earn eligibility for the bonus game of FREE ROLL. Another purpose of eligibility indicator 32 is to encourage the user to increase the wagered amount and/or to make additional specific wagers to qualify for the bonus game.

Figure 2B:
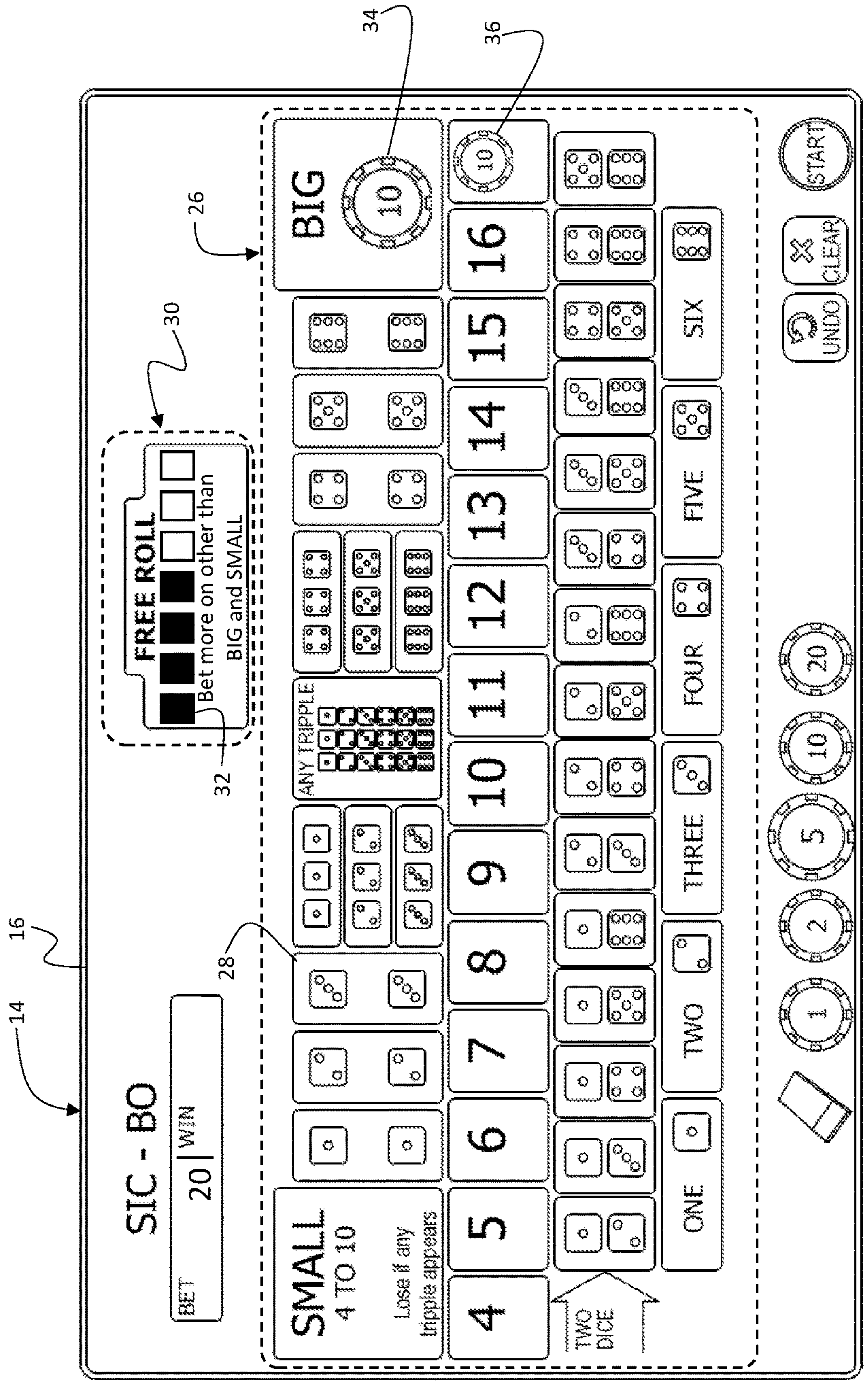
FIG. 2B is a schematic view of the display device displaying the GUI of the gaming machine after the user placed several wagers but has not yet qualified for the FREE ROLL bonus game.
Figure 2C:
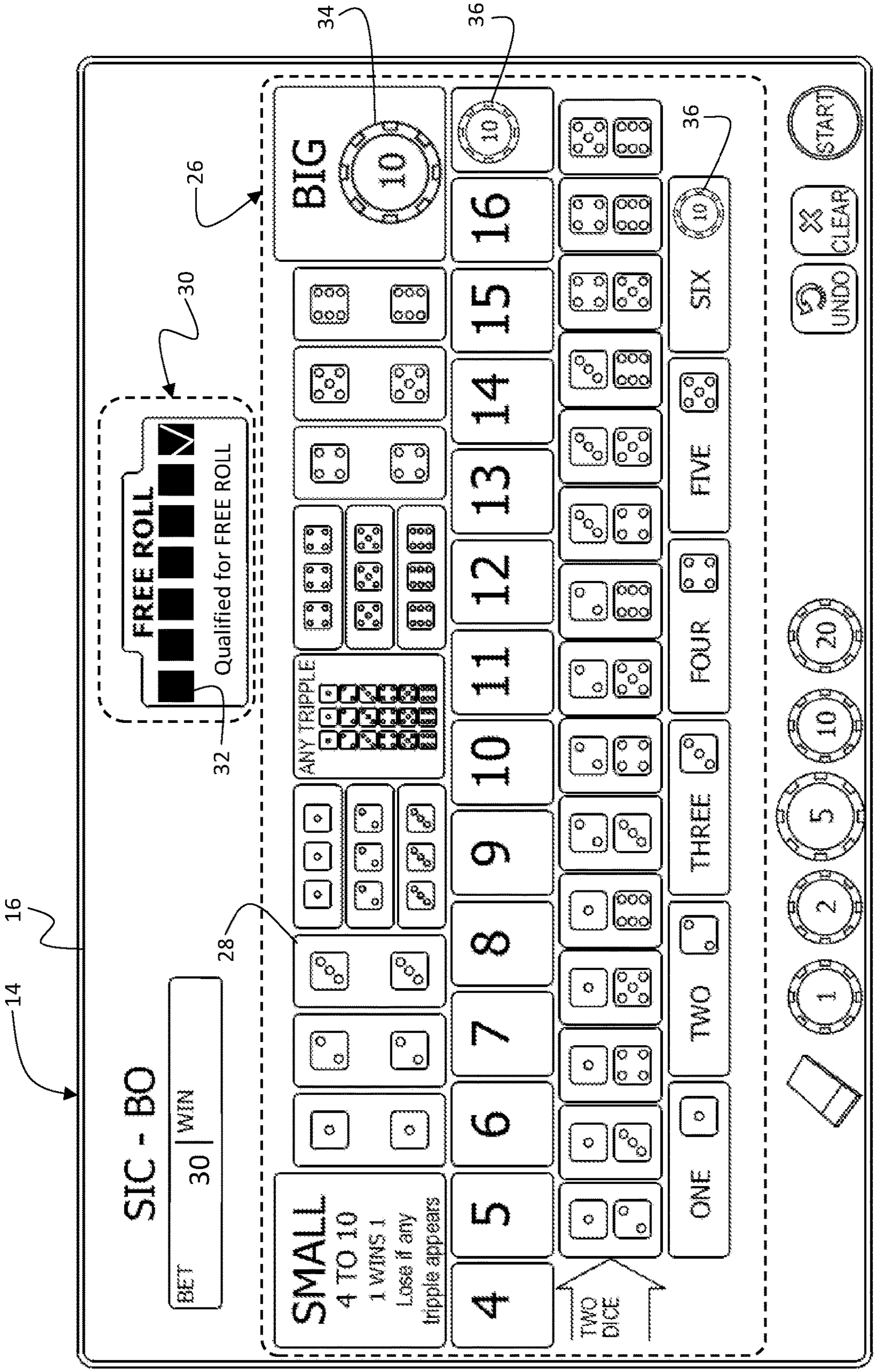
FIG. 2C is a schematic view of the display device displaying the GUI of the gaming machine when the user-placed wagers satisfy one or more predetermined conditions and the user gains eligibility for the FREE ROLL bonus game.

For example, in the embodiment depicted in FIGS. 2A-2C, eligibility indicator 32 provides a plurality of bars that fill up sequentially as the user makes qualifying bets. Second display area 30 further displays a message encouraging the user to "Bet more on other than BIG and SMALL." FIG. 2A depicts that at the beginning of betting, prior to any bets being placed, every bar of eligibility indicator 32 is empty.

Continuing this example, FIG. 2B depicts that a user placed two wagers 34 and 36. In an embodiment, some wagering options 28 can be excluded from the FREE ROLL bonus game. In this embodiment, only qualifying wagers 36 placed on qualifying wagering options 28 contribute to gaining eligibility for the FREE ROLL bonus game. Gaming machine 10 can be preconfigured with data establishing which wagering options 28 are qualifying wagering options and which wagering options 28 are non-qualifying wagering options. In this example, wager 34 is a non-qualifying wager because it was placed on a "BIG" bet, which is a non-qualifying wagering option excluded from FREE ROLL eligibility. However, wager 36 is a qualifying wager because it was placed on a qualifying wagering option that brings the user closer to becoming eligible for FREE ROLL. Accordingly, in FIG. 2B, eligibility indicator 32 displays that the user has made some progress toward FREE ROLL eligibility but has not yet fully satisfied the predefined condition for qualifying for FREE ROLL.

Next, FIG. 2C depicts that the user places another qualifying wager 36, which is sufficient to satisfy the predetermined condition for FREE ROLL eligibility. At this point, eligibility indicator 32 is configured to notify the user that he or she will participate in the bonus game of FREE ROLL.

Figure 2D:
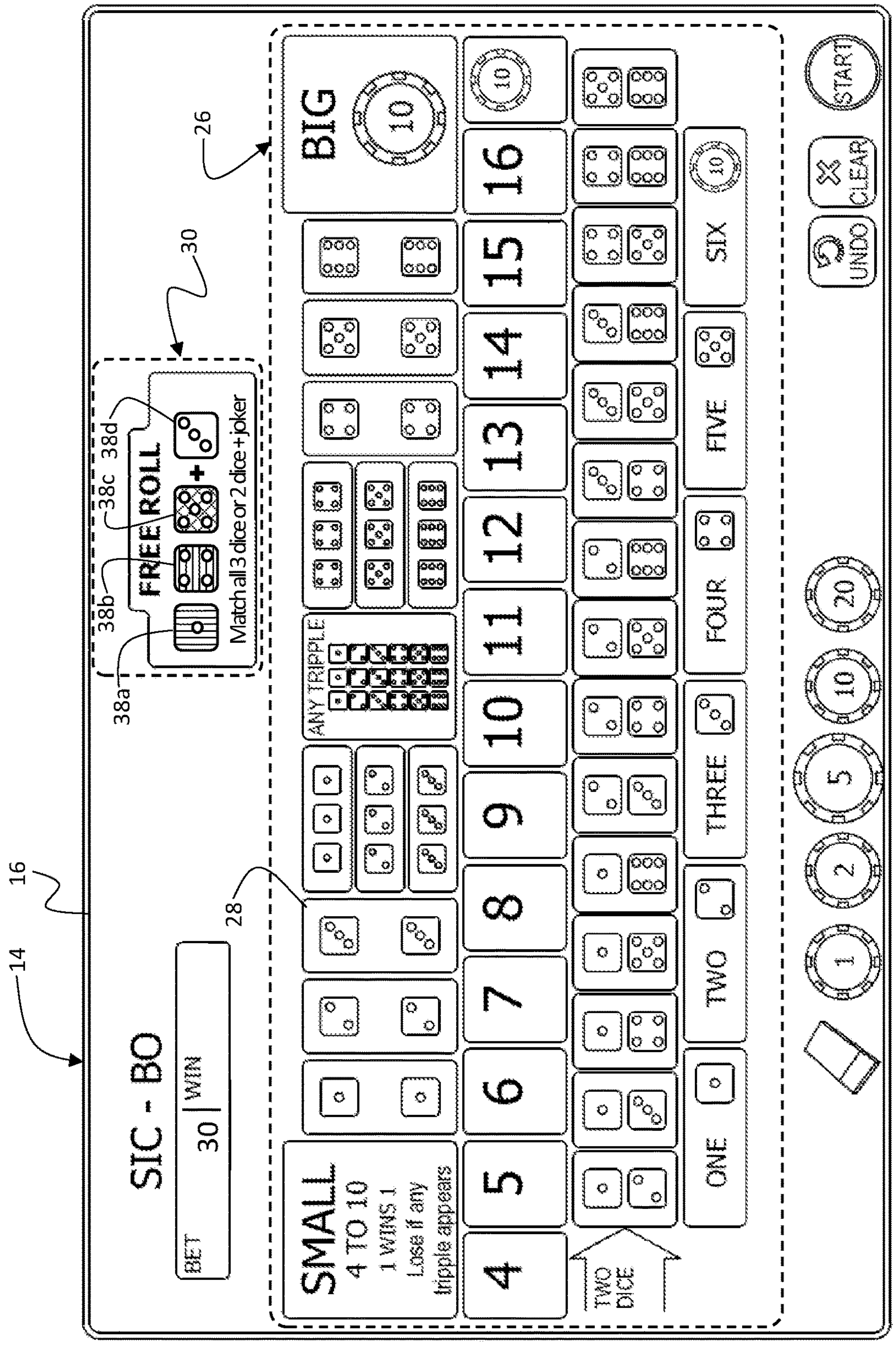
FIG. 2D is a schematic view of the display device displaying the GUI of the gaming machine wherein the second area of the display device displays a first plurality of differently colored die images displaying predicted die outcomes.
Figure 2E:
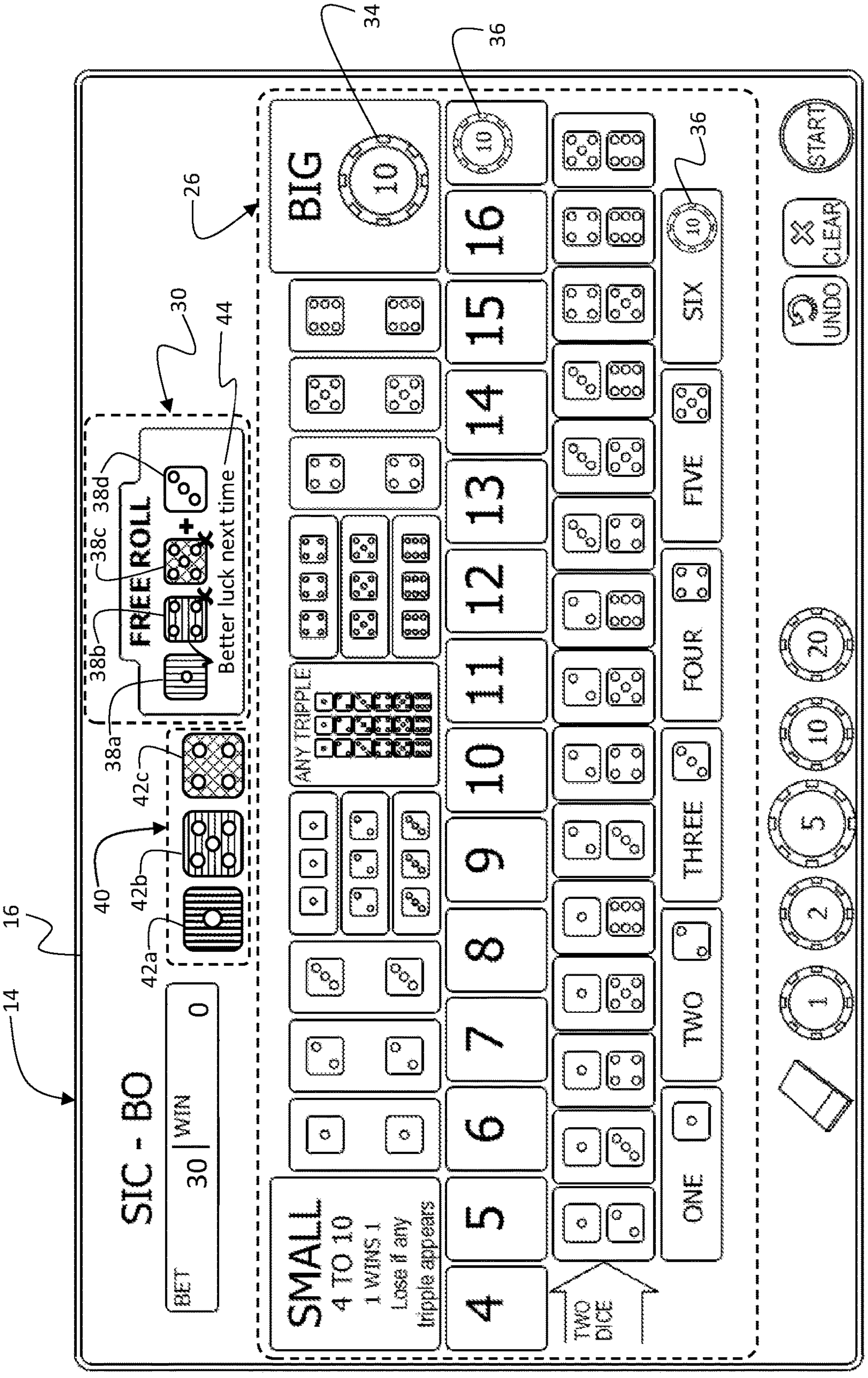
FIG. 2E is a schematic view of the display device displaying the GUI of the gaming machine wherein the third area of the display device displays a second plurality of differently colored die images displaying the actual die outcomes. In this scenario, an insufficient number of predicted die outcomes match the actual die outcomes and, therefore, the user does not win a reward in the bonus game.

Next, FIG. 2D depicts that after the user satisfies the condition for FREE ROLL eligibility, but prior to the dice roll in the main wagering game, second display area 30 of GUI 16 is configured to display four die images 38*a*, 38*b*, 38*c*, and 38*d*. Each die image 38*a*-38*d* represents a predicted die roll outcome. As depicted in FIGS. 1 and 2E and explained in more detail below, unlike traditional game of Sic Bo—which is played using three identical dice—the wagering dice game according to this exemplary embodiment of the present invention uses three visually distinct dice. The distinguishing visual characteristics of die images 38*a*, 38*b*, and 38*c* correspond to the visual characteristics of the three dice used in the main wagering game. If none of the predicted dice roll outcomes displayed on the die images 38*a*, 38*b*, and 38*c* match the actual dice roll result, the user does not receive any reward in the FREE ROLL bonus game. Conversely, gaming machine 10 may be configured to trigger a reward if at least some of the predicted die outcomes match the actual dice roll outcomes, in a predetermined manner. This aspect of the invention is disclosed in more detail below.

In an embodiment, the predicted dice roll outcomes displayed on die images 38*a-d* may be randomly selected by gaming machine 10. One advantage of the predicted dice roll outcomes being machine-selected is that the user does not have to divert his or her attention away from the main wagering game to participate in the FREE ROLL bonus game. Nevertheless, despite these advantages of machine-selected predicted outcomes, in some embodiments, gaming machine 10 may be configured to present the user with an option to manually select the predicted die outcomes displayed on die images 38*a-d*, for the purposes of the FREE ROLL bonus game.

Next, FIG. 2E depicts that display device 14 has a third display area 40. Third display area 40 is used to display die images 42*a*, 42*b*, and 42*c*, which correspond to the actual dice roll outcomes in the primary wagering game. In an embodiment, die images 42*a*, 42*b*, and 42*c* represent physical dice 24 used in mechanical generator 22. Alternatively, die images 42*a*, 42*b*, and 42*c* may represent die outcomes that are computer-generated. In either case, the number of pips displayed on each of die images 42*a*, 42*b*, and 42*c* determines the outcome of the primary wagering game and, also, determines the outcome of the FREE ROLL bonus game.

In an embodiment, the FREE ROLL bonus game yields a reward in two scenarios: (1) all three predicted dice roll outcomes displayed on die images 38*a*, 38*b*, and 38*c* match the actual dice roll outcomes depicted on die images 42*a*, 42*b*, and 42*c*, respectively; or (2) two actual dice roll outcomes depicted on die images 42*a*, 42*b*, and 42*c* match two of the predicted dice roll outcomes depicted on die images 38*a*, 38*b*, and 38*c*, respectively, and the third actual die roll outcome matches the predicted die outcome depicted on fourth die image 38*d* (fourth die image 38*d* is also referred to herein as "auxiliary die" or "joker"). In other embodiments, gaming machine 10 may be configured to reward users for other matching combinations—for example, matching two actual die outcomes displayed on die images 42*a*, 42*b*, and 42*c* with two predicted die outcomes displayed on die images 38*a*, 38*b*, and 38*c* respectively; or matching one actual die outcome displayed on die images 42*a*, 42*b*, and 42*c* with one predicted die outcome displayed on die images 38*a*, 38*b*, and 38*c*, respectively, and also matching another actual die result with the auxiliary die image 38*d*. Other ways of matching predicted and actual dice combinations may be used to yield various rewards in the FREE ROLL bonus game without departing from the scope of the invention.

In an exemplary round of the wagering game depicted in FIG. 2E, the actual die outcome displayed on die image 42*a* matches the predicted die outcome displayed on die image 38*a*. However, the actual die outcome displayed on die image 42*b* does not match the predicted die outcome displayed on die image 38*b*, and the actual die outcome displayed on die image 42*c* does not match the predicted die outcome displayed on die image 38*c*. Because this scenario does not fall within either of the two winning scenarios described in the preceding paragraph, in this round, the FREE ROLL bonus game does not yield any reward. A notification 44 is displayed to the user notifying the user that he or she did not win a reward in the FREE ROLL bonus game.

Figure 2F:
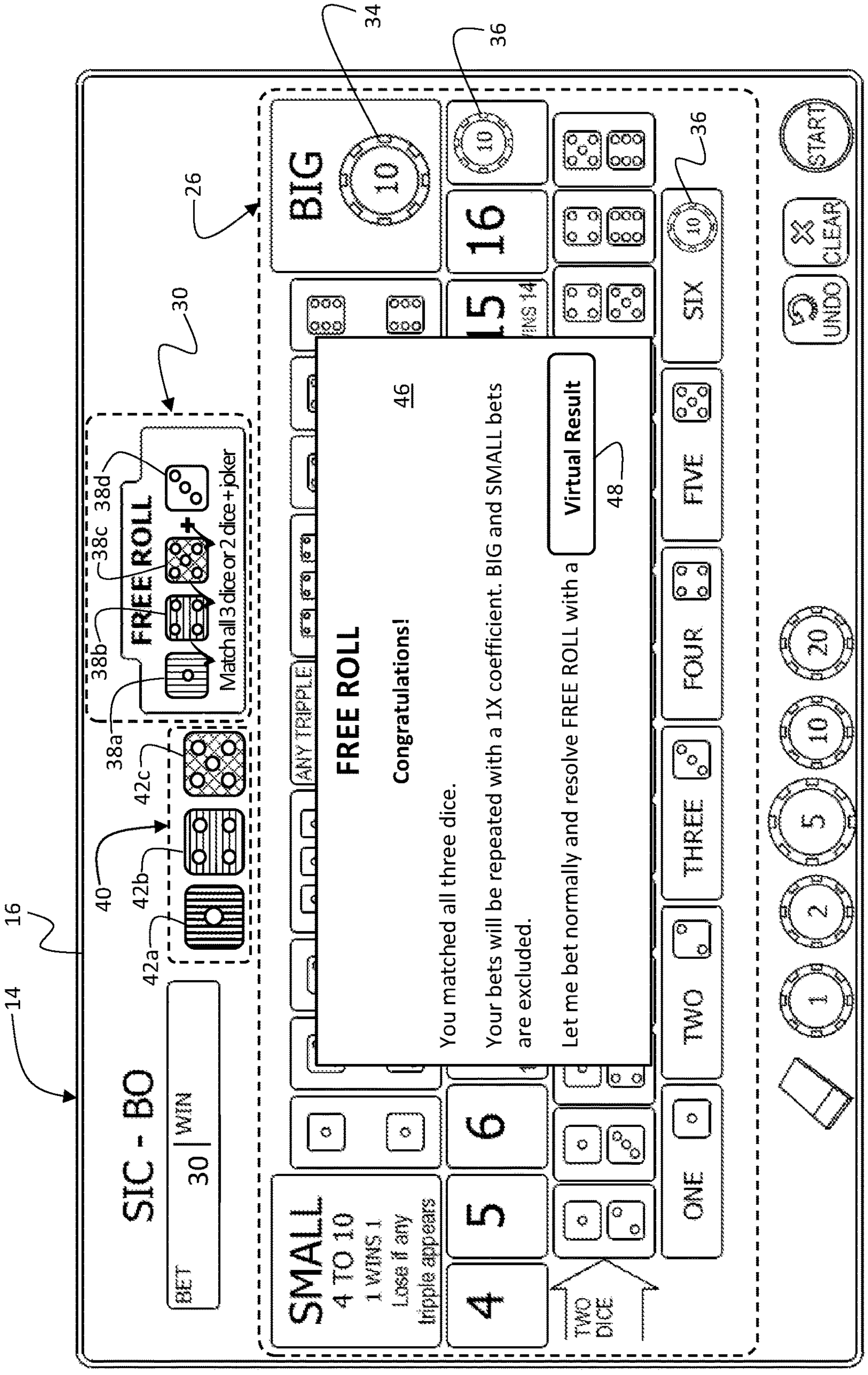
FIG. 2F is a schematic view of the display device displaying the GUI of the gaming machine wherein three colored die images displaying the predicted die outcomes match all three correspondingly colored die images displaying the actual die outcomes. In this scenario, the display device displays a notification informing the user that he or she won a reward in the bonus game.

Another exemplary round of the wagering game is depicted in FIG. 2F. In this round, the actual die outcomes displayed on all three die images 42*a*, 42*b*, and 42*c* match the predicted die outcomes depicted on die images 38*a*, 38*b*, and 38*c*, respectively. This exemplary round corresponds to the first winning scenario described above, and, therefore, in this exemplary round, the FREE ROLL bonus game yields a reward (herein referred to as a first reward). A notification 46 is displayed on display device 14 notifying the user that he or she won a first reward in the FREE ROLL bonus game.

Figure 2G:
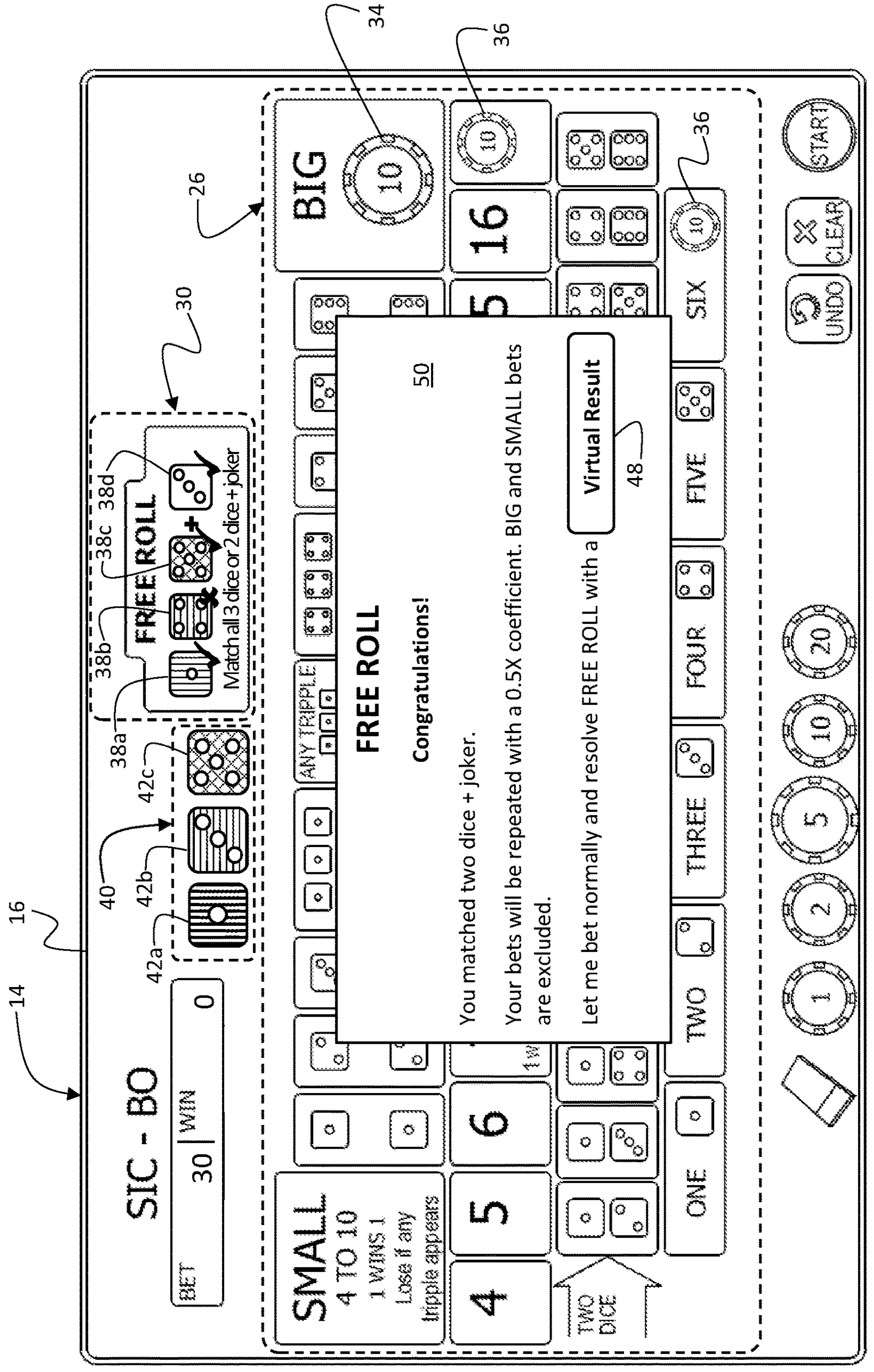
FIG. 2G is a schematic view of the display device displaying the GUI of the gaming machine wherein two colored die images displaying the predicted die outcomes match two correspondingly colored die images displaying the actual die outcomes, and the third actual die outcome matches the predicted die outcome displayed on the auxiliary die image (joker). In this scenario, the display device displays a notification informing the user that he or she won a reward.

FIG. 2G depicts yet another exemplary round of the wagering game in which wagers 36 gained the user eligibility to participate in the FREE ROLL. In this example, actual die outcomes displayed on die images 42*a* and 42*c* match the predicted die outcomes displayed on die images 38*a* and 38*c*, respectively. However, the actual die outcome displayed on die image 42*b* does not match the predicted die outcome displayed on die image 38*b*. In this example, the auxiliary die 38*d* (the joker) comes into play. Because the actual die outcome displayed on die image 42*b* matches the predicted die outcome displayed on die image 38*d*, this example falls within the second winning scenario. Therefore, the FREE ROLL bonus game yields a reward (herein referred to as a second reward). A notification 50 is displayed on display device 14 notifying the user that he or she won a second reward in the FREE ROLL bonus game.

In an embodiment, when the FREE ROLL bonus game yields a reward, qualifying wagers placed in the primary wagering game are repeated in the bonus round of the wagering game, without requiring to be funded by the user. Furthermore, the repeated wagers may be multiplied by a predefined coefficient. The coefficient for winning the first reward (in which all three dice match) may be higher than the coefficient for winning the second reward (in which two dice+auxiliary die match). As depicted in FIG. 2G, the FREE ROLL bonus game can be configured such that the coefficient may be less than one: for example, when the second reward is won, the user's wagers can be multiplied by 0.5 in the bonus round of the waging game, while FIG. 2F depicts that winning the first reward may yield a coefficient of 1, meaning that the full value of the qualifying wagers will be repeated. The coefficient can also be greater than one, in which case the wagers replayed for the next round would be increased in value.

Electronic gaming machine 10 may be further configured to exclude certain wagers from being repeated in the bonus round. For example, wager 34 placed on the non-qualifying "BIG" wagering option may be excluded, and only wagers 36, which are placed on the qualifying wagering options, are repeated in the bonus round of the wagering game. Furthermore, to qualify for the repeated wagers, the user may be required to satisfy additional conditions. In on example, such additional conditions require the user to place one or more new user-funded wagers in addition to the non-user funded wagers that are being replayed in the bonus round.

FIGS. 2F and 2G further depict that gaming machine 10 may be configured to present the user with an option 48 to resolve the bonus round (the round of the wagering game in which previous wagers are repeated) using a software-based random generator, rather than mechanical dice random generator 22 having physical dice 24. When gaming machine 10 is equipped with mechanical generator 22, some users might not wish to miss a roll of physical dice 24 because of the FREE ROLL bonus round. In such instances, users can choose to resolve the bonus round with a virtual result and continue betting normally on the next mechanically generated roll. Gaming machine 10 may be configured to present the user with an option to choose a mechanical dice roll or a virtual dice roll for the bonus round. This option ensures that the FREE ROLL bonus game does not interfere with primary wagering game.

Continuing reference to FIG. 2G, none of the user's wagers won in this round. Specifically, wager 34 on "BIG" and wagers 36, which have been placed on the sum of all tree dice being 17 and at least one die rolling a 6, all lost because the actual die outcomes were 1, 3, and 5. However, because the actual die outcomes displayed on die images 42*a*, 42*b*, and 42*c* matched the predicted die outcomes displayed on die images 38*a*, 38*c*, and 38*d* (two dice and the auxiliary (joker) die), the user won the second reward in the FREE ROLL bonus game. Accordingly, the wagering game progresses into the bonus round depicted in FIG. 2H.

Figure 2H:
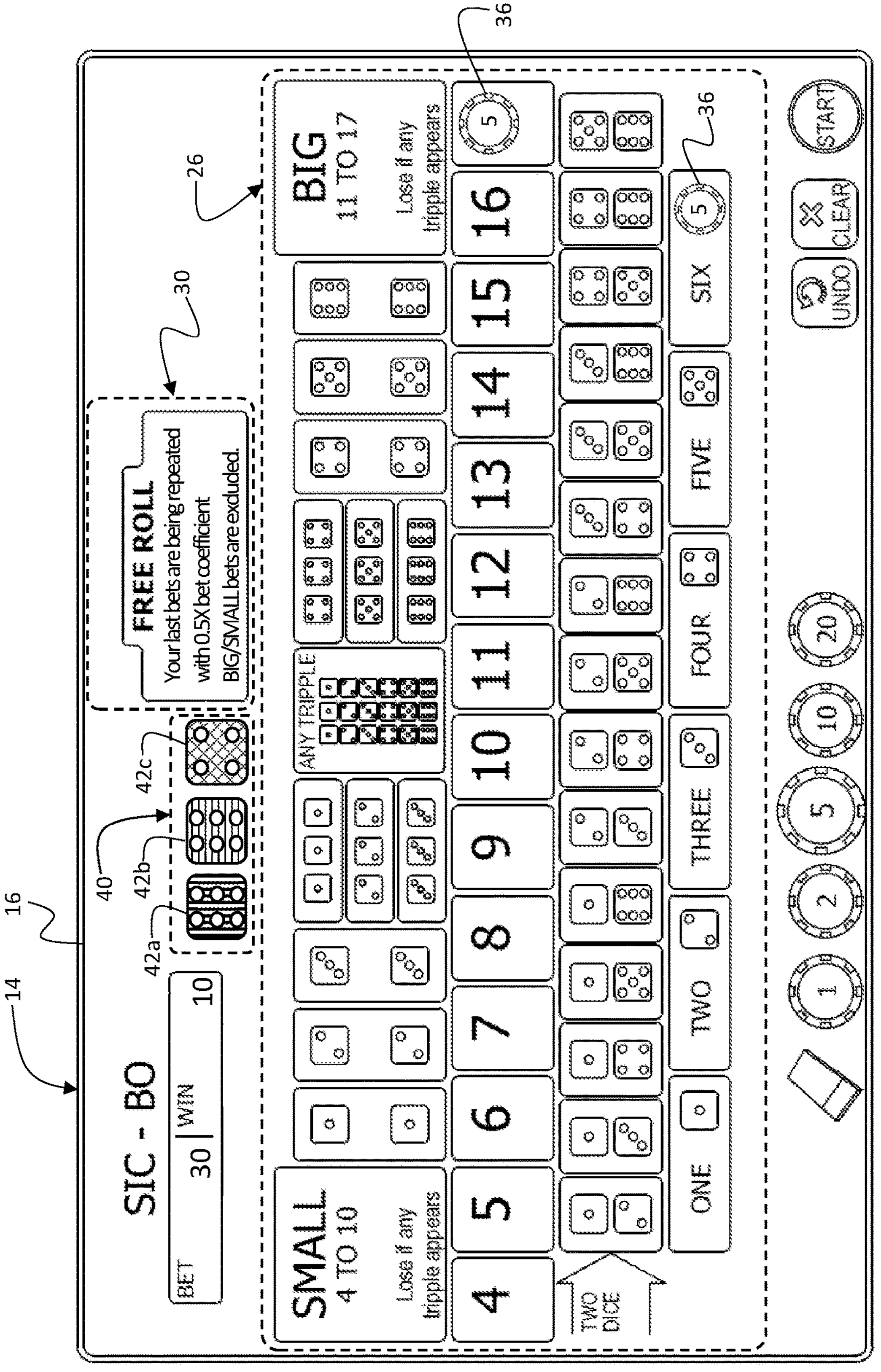
FIG. 2H is a schematic view of the display device displaying the GUI of the gaming machine displaying the bonus round in which qualifying user-placed wagers are repeated without requiring additional user-funding.

FIG. 2H depicts that wagers 36 are repeated in the bonus round, without requiring any additional funding from the user. In this example, the second reward in the FREE ROLL bonus game entails a 0.5 coefficient. Therefore, qualifying wagers 36 are reduced by a factor of 2—from the monetary value of 10 to 5—and are repeated in the bonus round.

Furthermore, wager 34 was placed on the "BIG" bet, which is a non-qualifying wagering option and, therefore, is excluded from the bonus round.

FIG. 2H depicts that in the bonus round the actual die outcomes displayed on die images 42*a-c* are 6, 6, and 4, respectively. Accordingly, wager 36 on the "SIX" bet wins. Thus, although the user's wagers did not yield any winnings in the first round of the wagering game, because the user won the FREE ROLL, qualifying wagers 36 were replayed for the bonus round, and one of the wagers 36 won. In this manner, the opportunity to replay the wagers—regardless of whether they were winning or losing in the initial round of the wagering game—increases user excitement and entertainment. Furthermore, because the FREE ROLL bonus game does not alter the primary wagering game (Sic Bo in this example), gaming machine 10 offers an unadulterated traditional wagering game experience that players know and enjoy. Indeed, even when winning the FREE ROLL bonus game, the bonus round can be resolved virtually, without missing an opportunity to place wagers on the next mechanical dice roll. In this manner, the FREE ROLL bonus game enhances a user's gaming experience without taking away from the primary wagering game.

Figure 3:
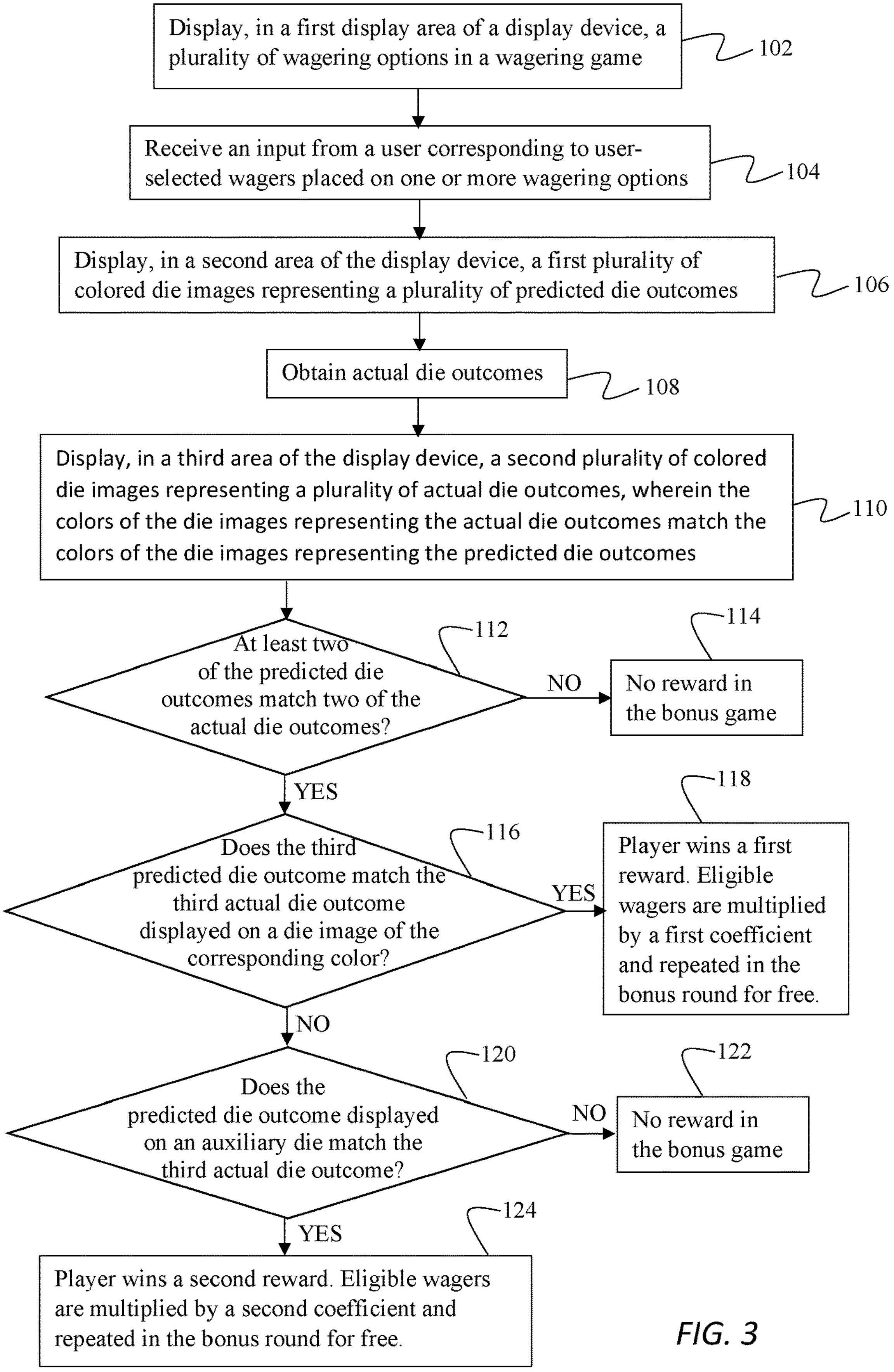
FIG. 3 is a flowchart schematically depicting the steps for determining a bonus reward in a wagering game according to an embodiment of the invention.

FIG. 3 is a flowchart depicting the steps of the method described above. FIG. 3 depicts that, in step 102, gaming machine 10 is configured to display a plurality of wagering options 28 in first display area 26 of display device 14. In step 104, gaming machine 10 receives an input from a user corresponding to user-selected wagers 34 and 36 placed on one or more wagering options 28. In step 106, gaming machine 10 is configured to display die images 38*a-d* displaying predicted die outcomes. Die images 38*a-d* are displayed in second display area 30 of display device 14.

Next, in step 108, gaming machine 10 obtains actual die outcomes from mechanical die outcome generator 22, a software-based die outcome generator, or a combination thereof. In step 110, gaming machine 10 displays die images 42*a-c* displaying actual die outcomes in third display area 40 of display device 14. In step 112, gaming machine 10 determines whether at least two of the predicted die outcomes displayed on die images 38*a-c* match the actual die outcomes displayed on correspondingly colored die images 42*a-c*. If they do not match, the method proceeds to step 114, in which notification 44 is displayed on display device 14 notifying the user that he or she did not win a reward in the current round of the FREE ROLL bonus game. However, if at least two of the predicted die outcomes displayed on die images 38*a-c* match the actual die outcomes displayed on the correspondingly colored die images 42*a-c*, the method proceeds to step 116.

In step 116, gaming machine 10 determines whether the third predicted die outcome displayed on the remaining image of die images 38*a*, 38*b*, and 38*c* matches the third actual die outcome displayed on the remaining image of die images 42*a*, 42*b*, or 42*c*. If the third die images match, then, in step 118, gaming machine 10 displays notification 46 on display device 14 notifying the user that the user won a first reward, which entitles the user to a bonus round, in which qualifying user-placed wagers 36 are multiplied by a predefined first coefficient and repeated without additional funding from the user. However, if the third actual die outcome does not match the third predicted die outcome, the method proceeds to step 120.

In step 120, gaming machine 10 determines whether the remaining third actual die outcome matches the predicted die outcome displayed on die image 38*d* (auxiliary die or joker). If they match, gaming machine 10 displays notification 50 on display device 14 notifying the user that he or she won a second reward and, therefore, is eligible to play a bonus round, in which the qualifying currently placed wagers 36 are multiplied by a second coefficient and replayed for free of charge to the user. However, if the predicted die outcome displayed on die image 38*d* does not match the remaining third actual die outcome displayed on a die image 42*a*, 42*b*, or 42*c*, gaming machine 10 outputs notification 44 on display device 14 notifying the user that he or she did not win a reward in the current round of the FREE ROLL bonus game.

Hardware and Software Infrastructure Examples

The present invention may be embodied on various computing platforms that perform actions responsive to software-based instructions and most particularly for low-vision user software. These include both traditional desktop and notebooks devices and also smartphones and tablets. Furthermore, the computing device may reside within the braille display, thus making the braille display a standalone reader for electronic documents. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to certain statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic, Objective C, Python or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, a "user" or a "player" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An electronic gaming machine comprising:
a display device;
a computer processor; and
a tangible, non-transitory computer-readable storage medium having a plurality of instructions stored thereon, which, when executed by the computer processer, cause the computer processor to:
display, in a first display area of the display device, a plurality of wagering options in a wagering game;
receive an input from a user corresponding to user-selected wagers placed on one or more of the plurality of wagering options;
display, in a second area of the display device, a first plurality of differently colored die images depicting a plurality of predicted die outcomes;
obtain actual die outcomes from a mechanical die outcome generator, a software-based die outcome generator, or a combination thereof;
display, in a third area of the display device, a second plurality of differently colored die images depicting the actual die outcomes, wherein colors of second plurality of die images correspond to the colors of the first plurality of die images; and
responsive to a first predefined quantity of like-colored die images of the first plurality and the second plurality of die images depicting identical die outcomes, display a first notification on the display device notifying the user that the user won a first reward.

2. The electronic gaming machine of claim 1, wherein responsive to a second predefined quantity of like-colored die images of the of the first plurality and the second plurality of die images depicting identical die outcomes, and one of the first plurality of die images displaying identical die outcome as a differently-colored die image of the second plurality of die images, a second notification is displayed on the display device notifying the user that the user won a second reward.

3. The electronic gaming machine of claim 2, wherein responsive to the user winning the first reward or the second reward, at least some of the user-selected wagers are repeated for a bonus round of the wagering game, wherein repeated wagers are non-user funded.

4. The electronic gaming machine of claim 3, wherein the user is presented with an option to resolve the bonus round of the wagering game based on an outcome of the software-based die outcome generator rather than an outcome of a physical dice roll in the mechanical die outcome generator.

5. The electronic gaming machine of claim 3, wherein a monetary amount associated with the at least one of the user-selected wagers is automatically multiplied in the bonus round of the wagering game, wherein the monetary amount is multiplied by a first coefficient responsive to the user winning the first reward, or wherein the monetary amount is multiplied by a second coefficient, lower than the first coefficient, responsive to the user winning the second reward.

6. The electronic gaming machine of claim 3, wherein at least one of the user-selected wagers is excluded from the repeated wagers in the bonus round of the wagering game.

7. The electronic gaming machine of claim 1, wherein the actual die outcomes are provided by three physical dice.

8. The electronic gaming machine of claim 1, wherein the user-selected wagers must satisfy a predetermined condition as a prerequisite for eligibility to win the first reward.

9. The electronic gaming machine of claim 8, wherein the plurality of wagering options comprises qualifying and non-qualifying wagering options, and wherein the predetermined condition requires the user to select one or more qualifying wagering options to gain eligibility to win the first reward.

10. The electronic gaming machine of claim 8, wherein the predetermined condition requires the user-selected wagers to have an associated monetary or credit value exceeding a predefined threshold.

11. The electronic gaming machine of claim 8, wherein an indicator is displayed on the display device, conveying to the user whether the user-selected wagers satisfy the predetermined condition.

12. The electronic gaming machine of claim 1, wherein the user must elect a reduced payout for the user-selected wagers in the wagering game as a prerequisite for eligibility to win the first reward.

13. The electronic gaming machine of claim 1, wherein each of the plurality of the predicted die outcomes is machine-selected rather than user-selected.

14. The electronic gaming machine of claim 1, wherein the wagering game is Sic Bo or a variant thereof.

15. The electronic gaming machine of claim 1, further comprising a credit input mechanism configured to interact with a physical item associated with a monetary value to establish a credit balance for the user to fund the user-selected wagers.

16. The electronic gaming machine of claim 15, further comprising a cash-out mechanism configured to enable a withdrawal from the credit balance.

17. The electronic gaming machine of claim 1, wherein responsive to the user winning the first reward, the user is presented with an option to place an additional user-funded wager in a bonus round, wherein responsive to the user placing the additional user-funded wager, at least some of the user-selected wagers are repeated for the bonus round of the wagering game, wherein repeated wagers are non-user funded.

18. A computer-implement method for playing a wagering game, comprising the steps of:

displaying, in a first display area of a display device, a plurality of wagering options in a wagering game;

receiving an input from a user corresponding to user-selected wagers placed on one or more of the plurality of wagering options;

displaying, in a second area of the display device, a first plurality of differently colored die images depicting a plurality of predicted die outcomes;

obtaining actual die outcomes from a mechanical die outcome generator, a software-based die outcome generator, or a combination thereof;

displaying, in a third area of the display device, a second plurality of differently colored die images depicting the actual die outcomes, wherein colors of second plurality of die images correspond to the colors of the first plurality of die images; and responsive to a first predefined quantity of like-colored die images of the first plurality and the second plurality of die images depicting identical die outcomes, displaying a first notification on the display device notifying the user that the user won a first reward.

19. The method of claim 18, wherein responsive to a second predefined quantity of like-colored die images of the of the first plurality and the second plurality of die images depicting identical die outcomes, and one of the first plurality of die images displaying identical die outcome as a differently-colored die image of the second plurality of die images, displaying a second notification on the display device notifying the user that the user won a second reward.

* * * * *